US006809638B2

(12) United States Patent
Lin

(10) Patent No.: US 6,809,638 B2
(45) Date of Patent: Oct. 26, 2004

(54) APPARATUS WITH RECEIVER HAVING SELECTABLE THRESHOLD TIME CONSTANT

(75) Inventor: Xing Ping Lin, Orchard Lake, MI (US)

(73) Assignee: TRW Inc., Lyndhurst, OH (US)

( * ) Notice: Subject to any disclaimer, the term of this patent is extended or adjusted under 35 U.S.C. 154(b) by 120 days.

(21) Appl. No.: 10/223,921

(22) Filed: Aug. 20, 2002

(65) Prior Publication Data

US 2004/0036589 A1 Feb. 26, 2004

(51) Int. Cl.[7] .............................................. B60C 23/00
(52) U.S. Cl. .................. 340/447; 340/442; 340/426.36; 340/426.17; 73/146.3
(58) Field of Search ................................ 340/447, 442, 340/426.36, 426.17, 426.15; 73/146.3

(56) References Cited

U.S. PATENT DOCUMENTS

| 5,193,210 | A |   | 3/1993 | Nicholas et al. | 455/226.3 |
| 5,463,374 | A |   | 10/1995 | Mendez et al. | 340/442 |
| 5,499,392 | A |   | 3/1996 | Grunwell | 455/260 |
| 6,100,603 | A |   | 8/2000 | Gold | 307/10.2 |
| 6,420,967 | B1 | * | 7/2002 | Ghabra et al. | 340/447 |
| 2003/0022681 | A1 | * | 1/2003 | Ruppel et al. | 455/506 |

OTHER PUBLICATIONS

U.S. Lin et al. patent application Ser. No. 09/255,321, filed Feb. 23, 1999 entitled Apparatus and Method for Remote Convenience Message Reception With Adjustable Pulse Detection Receiver Portion.
U.S. Lin patent application Ser. No. 09/264,555, filed Mar. 8, 1999 entitled Apparatus and Method for Remote Convenience Message Reception With Signal Strength Determination.

* cited by examiner

Primary Examiner—Daniel J. Wu
Assistant Examiner—Sihong Huang
(74) Attorney, Agent, or Firm—Tarolli, Sundheim, Covell & Tummino L.L.P.

(57) ABSTRACT

An apparatus (10) comprises a controller (82) for receiving a control parameter. At least one tire condition sensor (26–32) senses a tire condition and transmits a tire condition signal (34) indicative of the sensed tire condition. A receiver (78) receives the tire condition signal (34) and compares the received tire condition signal (34) to a changeable threshold to output a digital signal indicative of the received tire condition signal (34). The changeable threshold changes at time intervals determined by a time constant of the receiver (78). The time constant of the receiver (78) is variable. The controller (82) is operatively connected to the receiver (78) and varies the time constant of the receiver (78) in response to the received control parameter.

20 Claims, 4 Drawing Sheets

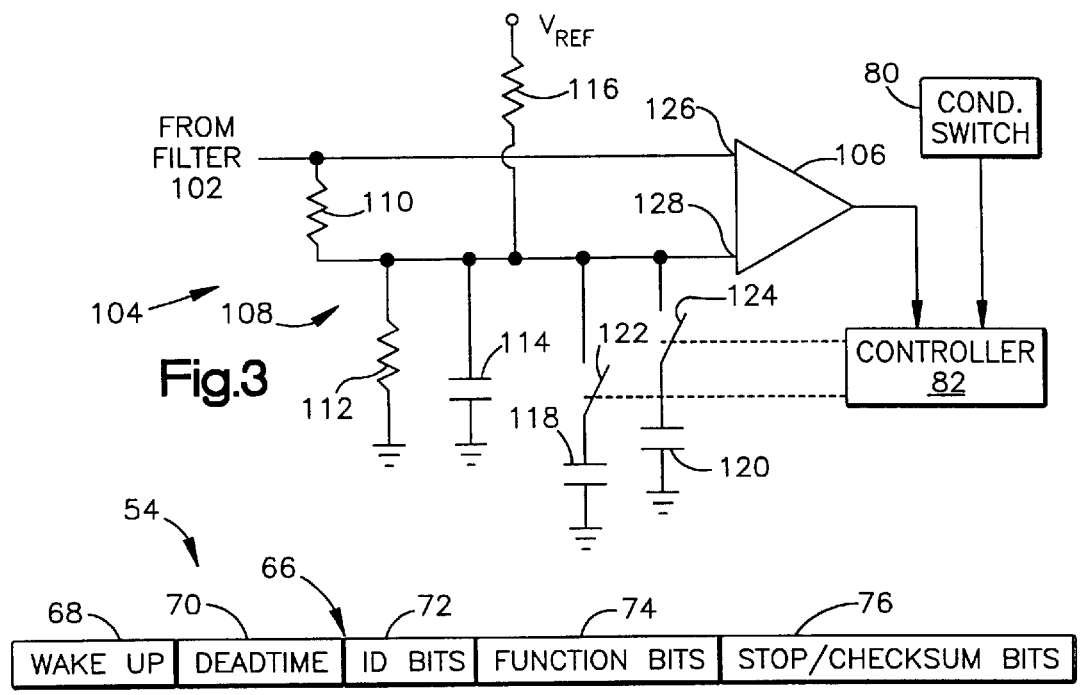
Fig.3
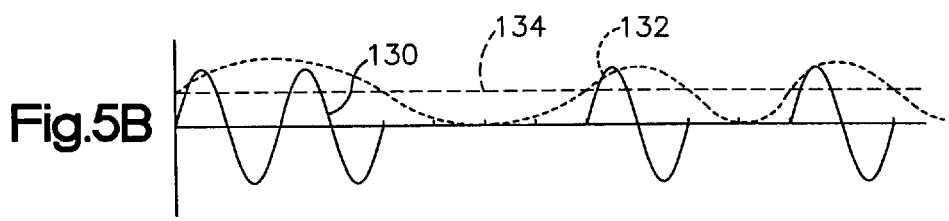
Fig.4A
Fig.4B
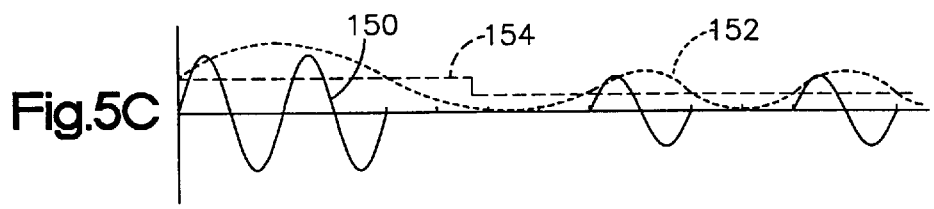
Fig.5A 1100101
Fig.5B
Fig.5C
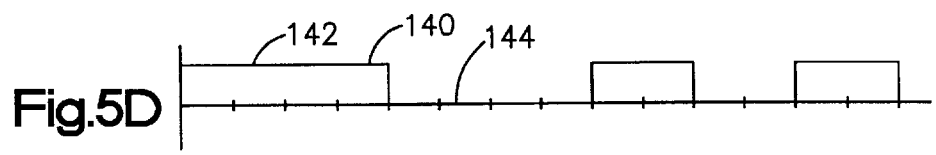
Fig.5D

APPARATUS WITH RECEIVER HAVING SELECTABLE THRESHOLD TIME CONSTANT

TECHNICAL FIELD

The present invention relates to an apparatus with a receiver for receiving tire condition signals. More particularly, the present invention relates to an apparatus with a vehicle-based receiver for receiving both tire condition signals and convenience function signals.

BACKGROUND OF THE INVENTION

A vehicle-based receiver receives a convenience function signal from a portable transmitter referred to as a fob and, in response to the convenience function signal, controls performance of a convenience function, such as locking or unlocking a vehicle door. The vehicle-based receiver also can receive a tire condition signal from a tire condition monitor and, in response to the tire condition signal, can control the display to indicate a sensed tire condition. The vehicle-based receiver includes a detector circuit for demodulating the convenience function signal and the tire condition signal. The detector circuit of the receiver includes a comparator that compares a carrier signal, after some initial processing, to a threshold value. The threshold value is dependent upon a time constant of the detector circuit.

The fob, which transmits the convenience function signal, is typically stationary or moving at a relatively low speed relative to the vehicle-based receiver when the convenience function signal is transmitted from the fob. As a result, the amplitude of the carrier signal for digital true values (i.e., ones) of an amplitude shift keyed message packet remains relatively constant throughout the transmission of the convenience function signal. The convenience function signal also includes a dead time between a preamble or wake-up portion and an identification portion of the convenience function signal. The dead time allows the receiver to "wake-up" from a low power consumption mode. As a result of the relatively constant amplitude and the dead time of the convenience function signal, a long time constant is desired for the detector circuit of the receiver that receives the convenience function signal.

Conversely, the tire condition monitor, which is fixedly mounted within a tire, may be moving at a relatively high speed, during tire rotation, relative to the receiver when the tire condition signal is transmitted. The amplitude of the carrier signal varies as a function of the distance between the transmitting tire condition monitor and the receiver during the transmission of the tire condition signal. As a result, the amplitude of the carrier signal for digital true values of the received amplitude shift keyed message packet varies because the distance changes during the transmission of the tire condition signal. Additionally, during operation of the vehicle, the tire condition signal does not include a dead time portion. As a result of the varying amplitude and no dead time of the tire condition signal, a shorter time constant, relative to the desired convenience function time constant, is desired for the detector circuit of the receiver that receives the tire condition signal.

A receiver for receiving both the convenience function signal and the tire condition signal that is designed with a fixed time constant would be only moderately sensitive to the convenience function signal and only moderately sensitive to the tire condition signal.

SUMMARY OF THE INVENTION

In accordance with an exemplary embodiment of the present invention, an apparatus is provided. An apparatus comprises a controller for receiving a control parameter. At least one tire condition sensor is also provided for sensing a tire condition and for transmitting a tire condition signal indicative of the sensed tire condition. A receiver is provided for receiving the tire condition signal and for comparing the received tire condition signal to a changeable threshold to output a digital signal indicative of the received tire condition signal. The changeable threshold changes at time intervals determined by a time constant of the receiver. The time constant of the receiver is variable. The controller is operatively connected to the receiver and varies the time constant of the receiver in response to the received control parameter.

In accordance with a second aspect of the present invention, an apparatus comprises at least one tire condition sensor for sensing a tire condition and for transmitting a tire condition signal indicative of the sensed tire condition. The apparatus also comprises a convenience function transmitter for transmitting a convenience function signal requesting performance of a convenience function. A display device is operable for displaying the sensed tire condition. A function device is actuatable for performing the convenience function. A vehicle-based receiver receives signals including the tire condition signal and the convenience function signal. The receiver has a variable time constant and outputs digital signals indicative of the received signals. A controller is operatively connected to the display device and the function device. The controller receives the digital signals from the receiver. The controller, in response to the received digital signals, controls the display device and the function device.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 3 schematically illustrates an exemplary average detector having a selectable threshold time constant that may be used in the receiver of FIG. 2;

FIG. 4A schematically illustrates a message packet for a convenience function signal;

FIG. 4B schematically illustrates a message packet for a tire condition signal;

FIG. 5A illustrates a digital signal;

FIG. 5B illustrates the digital signal of FIG. 5A amplitude shift keyed onto a carrier signal and having a constant amplitude;

FIG. 5C illustrates the digital signal of FIG. 5A amplitude shift keyed onto a carrier signal and having a varying amplitude;

FIG. 5D illustrates an output signal resulting from demodulation of the signals of FIGS. 5B and 5C;

DETAILED DESCRIPTION OF THE INVENTION

Figure 1:
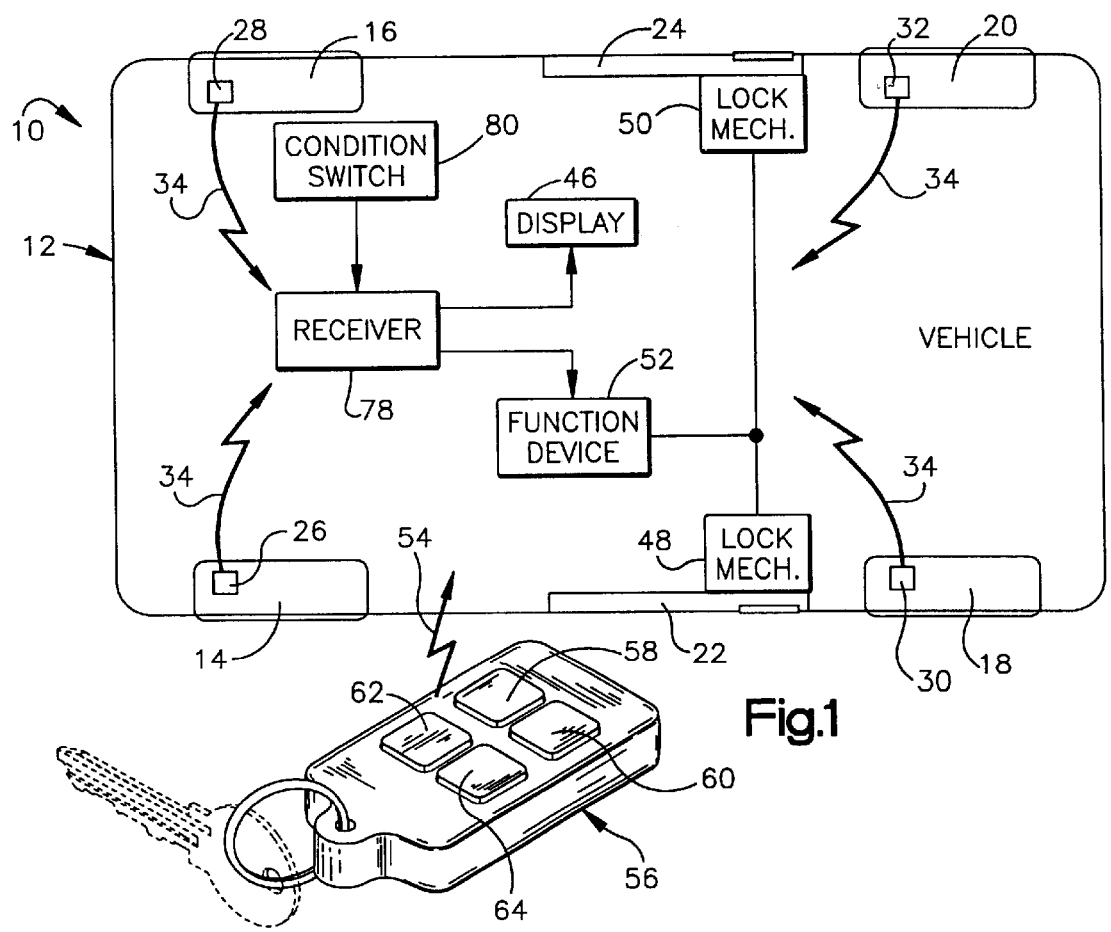
FIG. 1 is a schematic functional block diagram of an apparatus constructed in accordance with an exemplary embodiment of the present invention.

FIG. 1 is a schematic functional block diagram of an apparatus 10 constructed in accordance with an exemplary embodiment of the present invention. The apparatus 10 illustrated in FIG. 1 is used in connection with a vehicle 12. For illustrative purposes, the vehicle 12 of FIG. 1 includes four tires 14, 16, 18, and 20 and two doors 22 and 24. Vehicles having a number of tires other than four and/or a number of doors other than two are contemplated by the present invention.

Each tire 14–20 of the vehicle 12 includes an associated tire condition monitor 26, 28, 30, and 32, respectively, for sensing a condition of the tire. For example, the tire condition monitor 26 may sense the air pressure within tire 14 and/or the temperature of tire 14. Each associated tire condition monitor 26–32 is of a known design. U.S. Pat. No. 6,232,875, which is assigned to the assignee of the present invention, discloses a known tire condition monitor that may be used in the present invention. Each tire condition monitor 26–32 includes a transmitter (not shown) for transmitting a tire condition signal 34 that is indicative of the sensed tire condition. In the embodiment illustrated in FIG. 1, the tire condition signals 34 are radio frequency signals, each of which includes a message packet that is amplitude shift keyed onto a carrier signal.

FIG. 4B schematically illustrates a message packet 36 for the tire condition signal 34. The message packet 36 begins with a preamble or wake-up portion 38, which is followed by an identification portion 40. The identification portion 40 includes a unique identification of the respective tire condition monitor 26–32. A tire condition portion 42 follows the identification portion 40. The tire condition portion 42 includes data indicating the sensed tire condition or conditions. The message packet 36 ends with a post-amble or checksum 44.

As shown in FIG. 1, a display device 46 is mounted on the vehicle 12, preferably on or near the instrument panel (not shown) of the vehicle. As will be discussed below, the display device 46 provides a visual indication of each sensed tire condition.

Each door 22 and 24 of the vehicle 12 has an associated lock mechanism 48 and 50, respectively. The associated lock mechanism 48 of door 22 is operable to lock and unlock door 22 so as to prevent and permit entry into an interior of the vehicle 12. Similarly, the associated lock mechanism 50 of door 24 is operable to lock and unlock door 24 so as to prevent and permit entry into the interior of the vehicle 12.

A function device 52 is operatively connected to each lock mechanism 48 and 50. The function device 52 controls operation of each lock mechanism 48 and 50. As will be discussed in detail below, the function device 52 is responsive to a convenience function signal 54 transmitted by a remote keyless entry transmitter device or fob 56.

The fob 56 is a known device that includes a plurality of push buttons 58, 60, 62, and 64, four of which are shown in FIG. 1. Each button 58–64 on the fob 56 is actuatable for performing a particular convenience function. For example, button 60 may unlock one or both of the doors 22 and 24 of the vehicle 12 and button 58 may lock one or both of the doors 22 and 24. The fob 56 includes a transmitter (not shown). In response to actuation of a button 58–64, the fob 56 transmits the convenience function signal 54. In the embodiment illustrated in FIG. 1, the convenience function signal 54 is a radio frequency signal that includes a message packet that is amplitude shift keyed onto a carrier signal.

FIG. 4A schematically illustrates a message packet 66 for the convenience function signal 54. The message packet 66 begins with a preamble or wake-up portion 68, which is immediately followed by dead time 70. An identification portion 72 follows the dead time 70. The identification portion 72 includes a unique identification of the fob 56. A function portion 74 follows the identification portion 72. The function portion 74 includes data indicating the convenience function to be performed. The message packet 66 ends with a post-amble or checksum 76.

As shown in FIG. 1, a receiver 78 is mounted on the vehicle 12. The receiver 78 is adapted to receive signals including the tire condition signal 34 and the convenience function signal 54. The receiver 78 is operatively connected to the display device 46 and to the function device 52. In response to receiving a tire condition signal 34, the receiver 78 outputs tire condition information to the display device 46. In response to receiving a convenience function signal 54, the receiver 78 outputs a function signal to the function device 52.

In the embodiment illustrated in FIG. 1, a condition switch 80 is operatively connected to the receiver 78. The condition switch 80 monitors a condition that is indicative of the operation of the vehicle 12. Alternatively, the condition switch 80 may monitor a condition that is indicative of occupation of the vehicle 12. When actuated, the condition switch 80 outputs a vehicle condition signal in response to the sensed condition. For example, the condition switch 80, when monitoring a condition that is indicative of the operation of the vehicle 12, may include an ignition switch that is actuated upon an ignition-on condition of the vehicle. Alternately, the condition switch 80 may include a key-in sensor that is actuated upon insertion of an ignition key, a switch that is actuated in response to sensing motion of the vehicle 12, or a gear selector switch that is actuated in response to engagement of a drive gear of the vehicle transmission. Additionally, other vehicle operation condition switches are contemplated by the present invention.

The condition switch 80, when monitoring a condition that is indicative of occupation of the vehicle 12, may include a seat weight sensor that is actuated in response to sensing weight applied to a driver's seat (not shown) of the vehicle 12 or an occupant position sensor that senses presence of an occupant. Additionally, other occupant detection switches are contemplated by the present invention.

Figure 2:
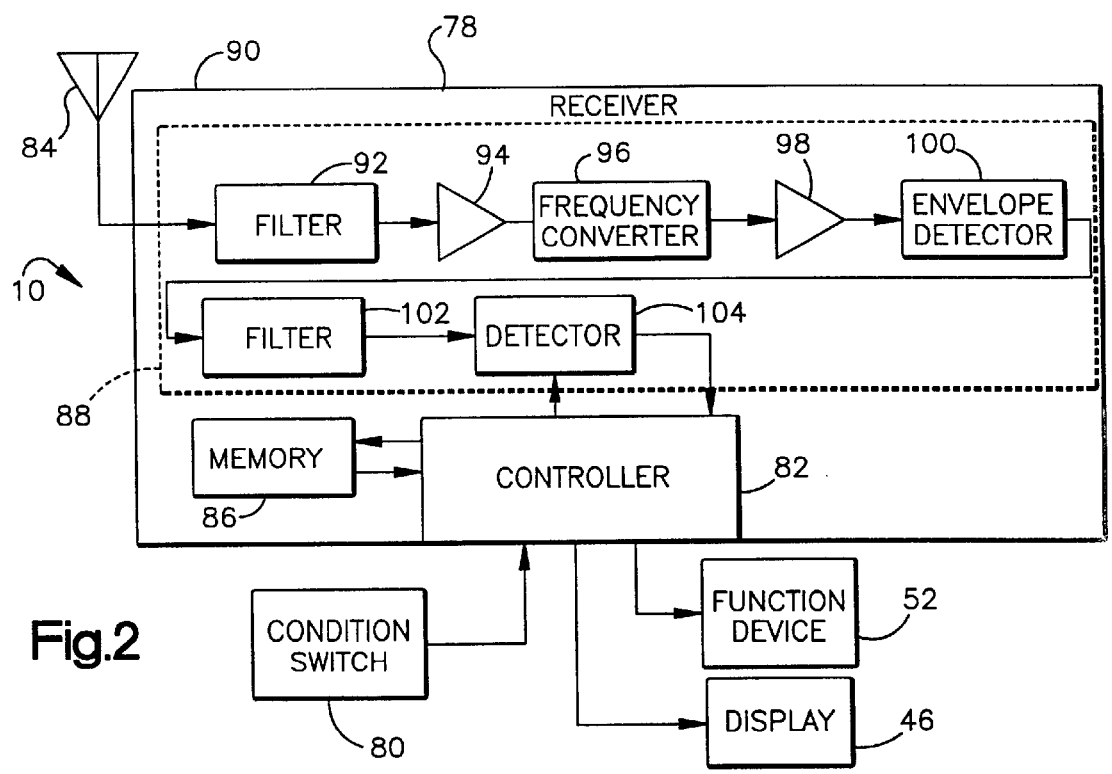
FIG. 2 is a schematic function block diagram of a receiver of the apparatus of FIG. 1.

FIG. 2 is schematic function block diagram of the receiver 78. The receiver 78 includes a controller 82. In one embodiment of the invention, the controller 82 is microcomputer. The controller 82 of the receiver 78 receives the vehicle condition signal output from the condition switch 80. The controller 82, in response to the vehicle condition signal, predicts which one of the tire condition signal 34 and the convenience function signal 54 is most likely to be the next signal received by the receiver 78. As will be discussed below, the controller 82 may select a time constant for the receiver 78 based upon the predicted next signal to be received.

Figure 7:
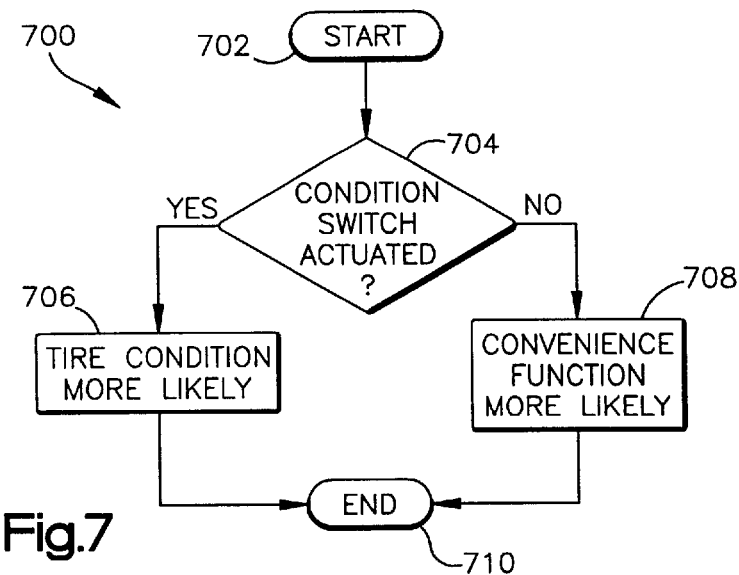
FIG. 7 is a schematic flow diagram illustrating a process for predicting the next signal to be received by the receiver.

FIG. 7 is a schematic flow diagram illustrating a process 700 performed by the controller 82 in predicting which of the tire condition signal 34 and the convenience function signal 54 is most likely to be the next signal received. The process 700 begins at step 702 where all memories are cleared, flags are set to initial conditions, etc. The process 700 then proceeds to step 704 where a determination is made as to whether the condition switch 80 has been actuated. If the condition switch 80 has been actuated, the vehicle condition signal indicates either operation of the vehicle 12 or occupation of the vehicle. For example, if the condition switch 80 is an ignition switch, actuation of the condition switch will indicate operation of the vehicle 12. If the determination at step 704 is affirmative, the process 700 proceeds to step 706 and a determination is made that receipt of the tire condition signal 34 is most likely. If the determination at step 704 is negative, the process 700 proceeds to step 708 and a determination is made that receipt of the convenience function signal 54 is most likely. The process 700 proceeds from steps 706 and 708 to step 710 where the process ends.

The receiver 78 also includes an antenna 84, a memory 86, and signal processing circuitry 88. The antenna 84 illustrated in FIG. 2 is external to the receiver 78. Alternatively, the antenna 84 may be located within a housing 90 of the receiver 78. The antenna 84 is operatively connected to the signal processing circuitry 88. When the antenna 84 receives a signal, the signal is input into the signal processing circuitry 88.

The controller 82 is operatively connected to the memory 86. The controller 82 may send information to the memory 86 for storage and may also retrieve information stored in the memory. Preferably, the memory 86 is a non-volatile memory. The memory 86 may form a portion of the controller 82.

The memory 86 stores a plurality of identifications, including a tire condition monitor identification corresponding to each tire condition monitor 26–32 and a fob identification corresponding to each authorized fob 56 for the vehicle 12. The memory 86 also includes location information associated with each of the tire condition monitor identifications of monitors 26–32. For example, one of the stored tire condition monitor identifications is associated with the front-left tire 14 of the vehicle 12, another with the front-right tire 16, and so on. The memory 86 also includes a look-up table that includes a plurality of function commands and a convenience function associated with each function command.

The signal processing circuitry 88 of the receiver 78 includes a first filter 92. The signal received by the antenna 84 is input into the first filter 92 of the signal processing circuitry 88. The first filter 92 filters out noise that is not indicative of either the tire condition signal 34 or the convenience function signal 54. A filtered signal is then input into a first amplifier 94 for amplification. The amplified signal is input into a frequency converter 96 in which the frequency of the signal is converted to a frequency that is more easily processed.

The frequency converter 96 includes a mixer (not shown), a reference oscillator (not shown), and a band pass filter (not shown). The mixer of the frequency converter 96 mixes the input signal from the amplifier 94 with a signal from the reference oscillator and outputs sum and difference signals to the band pass filter. The band pass filter filters out the sum signal and outputs the lower frequency difference signal.

The difference signal is amplified in a second amplifier 98. The amplified difference signal is then input into an envelope detector 100. The envelope detector 100 determines a waveform envelope of the signal. The waveform envelope of the signal is filtered in a second filter 102 and is input into a detector circuit portion 104 of the signal processing circuitry 88. The detector circuit portion 104 extracts the message packet from the signal.

FIG. 3 schematically illustrates an exemplary average detector having a selectable threshold time constant that may be used as the detector circuit portion 104 of the receiver 78 of FIG. 2. As an alternative to an average detector, a peak detector having a selectable time constant may be used.

The detector 104 of FIG. 3 includes a comparator 106 and an RC integrator 108. The RC integrator 108 has a charging time constant, which is a function of resistors 110 and 112 and capacitor 114, and a discharging time constant, which is a function of resistor 116, reference voltage $V_{REF}$, and one of capacitors 118 and 120. A first switch 122 connects capacitor 118 to the RC integrator 108 of the detector 104 and a second switch 124 connects capacitor 120 to the RC integrator 108 of the detector 104. The capacitance of capacitor 120 is greater than the capacitance of capacitor 118. In the average detector 104 of FIG. 3, one of first and second switches 122 and 124 may be closed for selecting a discharging time constant of the detector. Since the capacitance of capacitor 120 is greater than the capacitance of capacitor 118, the discharging time constant is longer (i.e., results in a slower discharge) when the second switch 124 is closed and the first switch 122 is open.

Alternative structures for adjusting the discharging time constant in the RC integrator 108 of the detector 104 include, but are not limited to, a variable capacitor, a variable resistor, a transistor for controlling current or voltage, and a varactor diode. A charging time constant of the RC integrator 108 of the detector 104 may be adjusted as an alternative or in addition to the adjustment of the discharging time constant.

The filtered waveform envelope, i.e., the output of filter 102, is input into a first input terminal 126 of the comparator 106 and is also input into the RC integrator 108. An output of the RC integrator 108 is a signal having an amplitude that is equal to the average amplitude of the filtered waveform envelope over the time period of the selected time constant. A longer discharging time constant for the RC integrator 108 results in a slower change of the output of the RC integrator in response to changes in the amplitude of the filtered waveform envelope. A shorter discharging time constant results in the output of the RC integrator 108 more closely tracking the amplitude of the filtered waveform envelope (i.e., the output changes more rapidly). The output of the RC integrator 108 is input into a second input terminal 128 of the comparator 106 and acts as a threshold value.

The comparator 106 of the detector 104 compares the filtered waveform envelope at 126 to the threshold value at 128. The comparator 106 outputs a high voltage signal when the filtered waveform envelope exceeds the threshold value and outputs a low voltage signal when the filtered waveform envelope does not exceed the threshold value.

For example, FIG. 5B illustrates the digital message packet of FIG. 5A amplitude shift keyed onto a carrier signal. The signal 130 in FIG. 5B is illustrative of a portion of a convenience function signal 54 transmitted by the fob 56. During transmission of the signal 130 of FIG. 5B, the distance between the transmitter (i.e., the fob 56) and the receiver 78 remains substantially constant. As a result, the amplitude of the signal 130 during digital true values (i.e., ones) remains substantially constant throughout transmission of the signal. FIG. 5B also illustrates the waveform envelope 132 of the signal 130. The dashed line 134 in FIG. 5B illustrates the threshold value. Since the signal 130 of FIG. 5B illustrates a portion of the convenience function signal 54, a longer discharging time constant for the RC integrator 108 is preferred. As a result, the threshold value 134 changes slowly. The threshold value 134 illustrated in FIG. 5B is shown as being constant throughout the transmission of the signal 130.

FIG. 5D illustrates the output 140 of the comparator 106 when the waveform envelope 132 of FIG. 5B and the threshold value 134 of FIG. 5B are input into the comparator 106. As is shown in FIG. 5D, a high voltage signal 142 or digital true is output when the waveform envelope 132 exceeds the threshold value 134 and a low voltage signal 144 or digital false is output when the waveform envelope does not exceed the threshold value. Thus, the output signal 140 of FIG. 5D is indicative of the message packet of FIG. 5A.

A second example is illustrated in FIG. 5C. FIG. 5C also illustrates the digital message packet of FIG. 5A amplitude shift keyed onto a carrier signal. The signal 150 in FIG. 5C is illustrative of a portion of a tire condition signal 34 transmitted by a tire condition monitor 26–32 during movement of the vehicle 12 (i.e., rotation of the respective tire 14–20). During transmission of the signal 150 of FIG. 5C, the distance between the transmitter (i.e., the tire condition monitor 26–32) and the receiver 78 changes. This change in distance arises as a result of rotation of the tire condition monitor 26–32 with the tire 14–20. The change in distance results in a change in the amplitude of the signal 150 during digital true values (i.e., ones). For simplicity, FIG. 5C illustrates transmission of the signal 150 at two different distances. The least significant bits of the message packet (i.e., the right-hand portion of signal 150) are transmitted at a farther distance than the most significant bits of the message packet (i.e., the left-hand portion of signal). As a result, the amplitude of the signal 150 during digital true values of the least significant bits is less than the amplitude of the signal during digital true values of the most significant bits.

FIG. 5C also illustrates the waveform envelope 152 of the signal. The dashed line 154 in FIG. 5C illustrates the threshold value. Since the signal 150 of FIG. 5C illustrates a portion of the tire condition signal 34, a shorter discharging time constant for the RC integrator 108 is preferred. As a result, the threshold value 154 changes more rapidly (i.e., more closely tracks the amplitude changes of the signal 150). For illustrative purposes, the threshold value 154 illustrated in FIG. 5C is shown as changing one time during the transmission of the signal 150.

FIG. 5D also illustrates the output 140 of the comparator 106 when the waveform envelope 152 of FIG. 5C and the threshold value 154 of FIG. 5C are input into the comparator. As is shown in FIG. 5D, a high voltage signal 142 or digital true is output when the waveform envelope 152 exceeds the threshold value 154 and a low voltage signal 144 or digital false is output when the waveform envelope does not exceed the threshold value. Thus, the output signal 140 of FIG. 5D is indicative of the message packet of FIG. 5A.

As shown in FIGS. 2 and 3, the output signal from the comparator 106 of detector 104 is input into the controller 82. The controller 82 is also operatively connected back to the detector 104. Specifically, the controller 82 controls the opening and the closing of the first and second switches 122 and 124 of the detector 104 for changing the discharging time constant of the RC integrator 108 of the detector. The controller 82 controls the time constant in response to the vehicle condition signal output from the condition switch 80. Particularly, the controller 82 controls the first and second switches 122 and 124 to provide the detector 104 with a first time constant when the process 700 of FIG. 7 predicts receipt of a tire condition signal 34 is most likely and to provide the detector 104 with a second time constant, different from the first time constant, when the process 700 of FIG. 7 predicts receipt of a convenience function signal 54 is most likely.

In a preferred embodiment, the controller 82 controls the first and second switches 122 and 124 of the RC integrator 108 of the detector 104 to provide a longer discharging time constant (i.e., switch 124 is closed) when a convenience function signal 54 is most likely to be received and to provide a shorter discharging time constant (i.e., switch 122 is closed) when a tire condition signal 34 is most likely to be received. By providing a longer discharging time constant when the convenience function signal 54 is most likely to be received, the threshold value input into the comparator 106 remains relatively constant throughout transmission of the convenience function signal. During the dead time 70 of the convenience function signal 54, the threshold value does not change dramatically, thereby preventing noise from corrupting the output of the comparator 106. As a result, the ability of the receiver 78 to receive the convenience function signal 54 at a greater distance is increased.

The tire condition signals 34 may still be processed when the detector 104 is operating with the longer discharging time constant but smaller amplitude portions of the tire condition signal 54 are more likely to fail to exceed the threshold that results from the longer discharging time constant. As a result, the likelihood of receiving an erroneous tire condition signal 54 is increased with the longer discharging time constant. By providing a shorter discharging time constant when the tire condition signal 34 is most likely to be received, the threshold value input into the comparator 106 varies during the transmission of the tire condition signal. Thus, the threshold value tracks the amplitude changes of the tire condition signal 34 so that a digital true is not misinterpreted as a digital false, resulting in a corrupted (i.e., not indicative of the message packet 36) output from the comparator 106. As a result, the ability of the receiver 78 to receive a tire condition signal 34 is increased. It is noted that the convenience function signal 54 may still be processed when the detector 104 is operating with the shorter discharging time constant but the distance at which the convenience function signal 54 may be correctly received is decreased dramatically relative to the distance when the longer discharging time constant is used.

Figure 6:
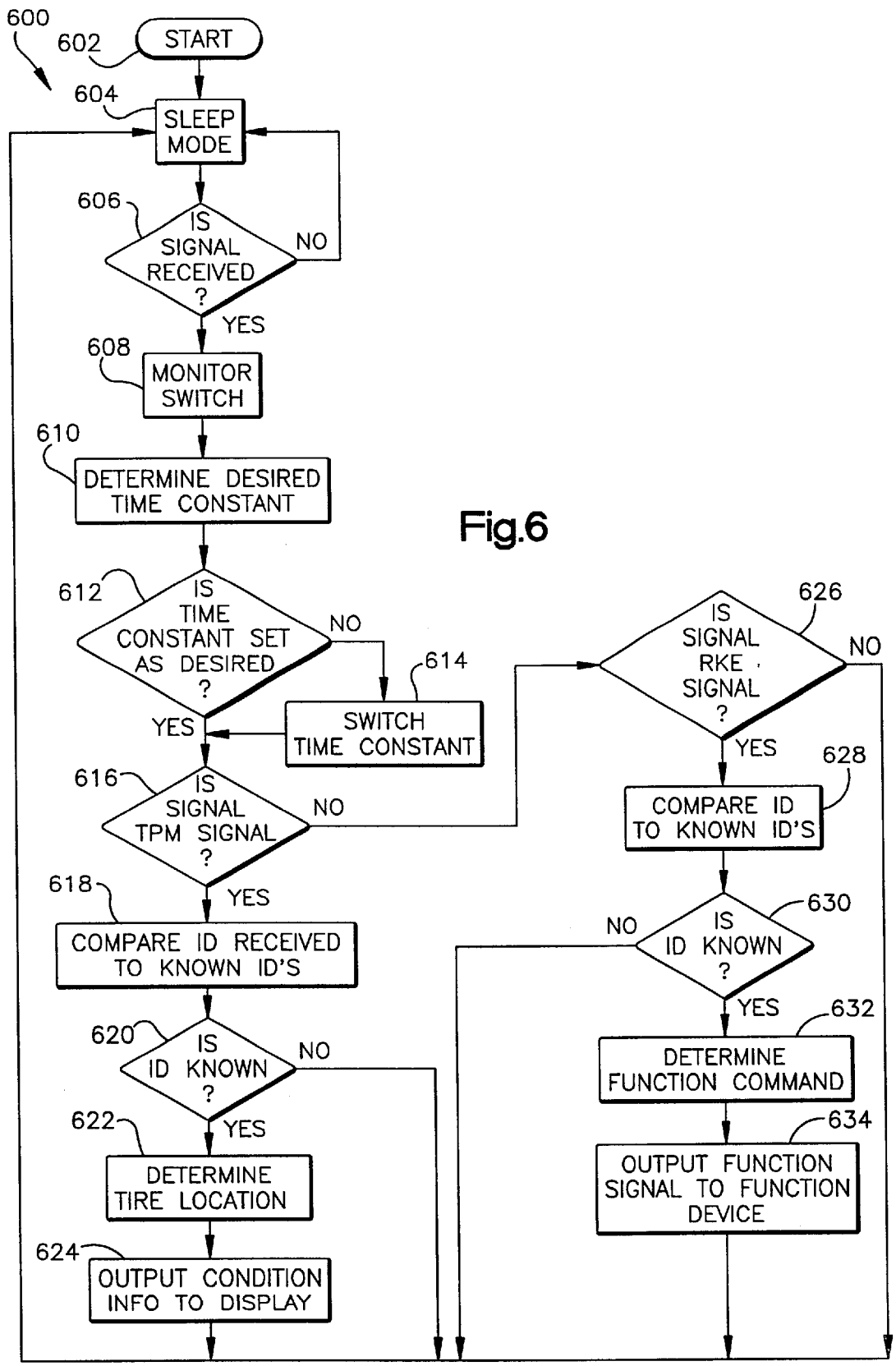
FIG. 6 is a schematic flow diagram illustrating a process of operation of the receiver of FIG. 2.

FIG. 6 is a flow diagram illustrating an exemplary process 600 of operation of the controller 82 of the receiver 78 of FIG. 2. The process 600 starts at step 602 in which the controller 82 is initialized, memories are cleared and set to initial values, and flags are set to initial conditions, etc. At step 604, the controller 82 enters a sleep mode or a low power consumption mode. The process 600 proceeds to step 606. At step 606, the controller 82 awakes and a determination is made as to whether a signal is received. If the determination at step 606 is negative, the process 600 returns to step 604 and the controller 82 re-enters the sleep mode. If the determination at step 606 is affirmative, the process 600 proceeds to step 608.

At step 608, the controller 82 monitors the condition switch 80 to determine whether the condition switch has been actuated. The process 600 then proceeds to step 610 where the controller 82 determines the desired time constant for the RC integrator 108 of the detector 104. The process 700 of FIG. 7 is used for the determination at step 610, i.e., the desired time constant is that which corresponds to the more likely signal to be received. The process 600 then proceeds to step 612.

At step 612, a determination is made as to whether the detector time constant is set as desired. If the determination at step 612 is negative, the process 600 proceeds to step 614 in which the controller 82 changes the detector time constant, i.e., closes the appropriate switch 122 or 124. The process 600 then proceeds to step 616. If the determination at step 612 is affirmative, the process 600 proceeds to step 616.

At step 616, a determination is made as to whether the signal received is the tire condition signal 34. In determining if the signal received is a tire condition signal 34, the controller 82 may interpret data included in the preamble of the signal that indicates whether the signal is a tire condition signal 34 or a convenience function signal 54. Alternately, the controller 82 may monitor the data rate or data format of the received signal to determine whether the signal is a tire condition signal 34 or a convenience function signal 54. If the data rate or data format is used to determine which signal is received, the tire condition signal 34 and the convenience function signal 54 must be transmitted at different data rates or using different data formats.

If the determination at step 616 is affirmative, the process 600 proceeds to step 618. At step 618, the controller 82 compares an identification 40 received in the message packet 36 of the tire condition signal 34 to reference identifications stored in memory 86. The process 600 then proceeds to step 620 in which a determination is made as to whether the identification 40 received is known. If the determination at step 620 is negative, the process 600 proceeds returns to step 604.

If the determination at step 620 is affirmative, the process 600 proceeds to step 622. At step 622, the controller 82 determines the tire location associated with the identification 40 received in the tire condition signal 34. To determine the tire location associated with the identification 40, the controller 82 accesses a look-up table stored in memory 86. The process 600 then proceeds to step 624 in which the controller 82 outputs tire condition information to the display device 46. From step 624, the process 600 returns to step 604.

If the determination at step 616 is negative, i.e., the signal is not a tire condition signal 34, the process 600 proceeds to step 626. At step 626, a determination is made as to whether the signal received is the convenience function signal 54. In determining if the signal received is a convenience function signal 54, the controller 82 may interpret data included in the preamble or wake-up portion of the signal that indicates whether the signal is a tire condition signal 34 or a convenience function signal 54. Alternately, the controller 82 may monitor the data rate or data format of the received signal to determine whether the signal is a tire condition signal 34 or a convenience function signal 54. If the data rate or data format is used to determine which signal is received, the tire condition signal 34 and the convenience function signal 54 must be transmitted at different data rates or using different data formats.

If the determination at step 626 is negative, the process 600 returns to step 604. If the determination at step 626 is affirmative, the process 600 proceeds to step 628. At step 628, the controller 82 compares the identification 72 received in the message packet 66 of the convenience function signal 54 to reference identifications stored in memory 86. The process 600 then proceeds to step 630. At step 630, a determination is made as to whether the identification 72 received is known. If the determination at step 630 is negative, the process 600 returns to step 604. If the determination at step 630 is affirmative, the process 600 proceeds to step 632.

At step 632, the controller 82 determines the function command associated with the function portion 74 received in the message packet 66 of the convenience function signal 54. To determine the function command associated with the function portion 74, the controller 82 accesses a look-up table stored in memory 86. The process 600 then proceeds to step 634. At step 634, the controller 82 outputs a function signal to the function device 52 commanding the function device to perform the desired convenience function. The process 600 then returns to step 604.

The display device 46, in response to receiving condition information from the controller 82, displays the tire location and the associated sensed tire condition information. The function device 52, in response to receiving the function signal from the controller 82, performs the commanded convenience function, e.g., outputs appropriate control signals to lock or unlock a desired door.

By varying the time constant of the detector circuit 104, the receiver 78 ability to receive both the convenience function signal 54 and the tire condition signal 34 is increased. For example, when the detector circuit 104 has a longer time constant, the receiver's ability to receive the convenience function signal 54 and thus, the operable distance between the fob 56 and the receiver 78, is increased. When the detector circuit 104 has a shorter time constant, the receiver's ability to receive the tire condition signal 34 is increased.

Figure 8:
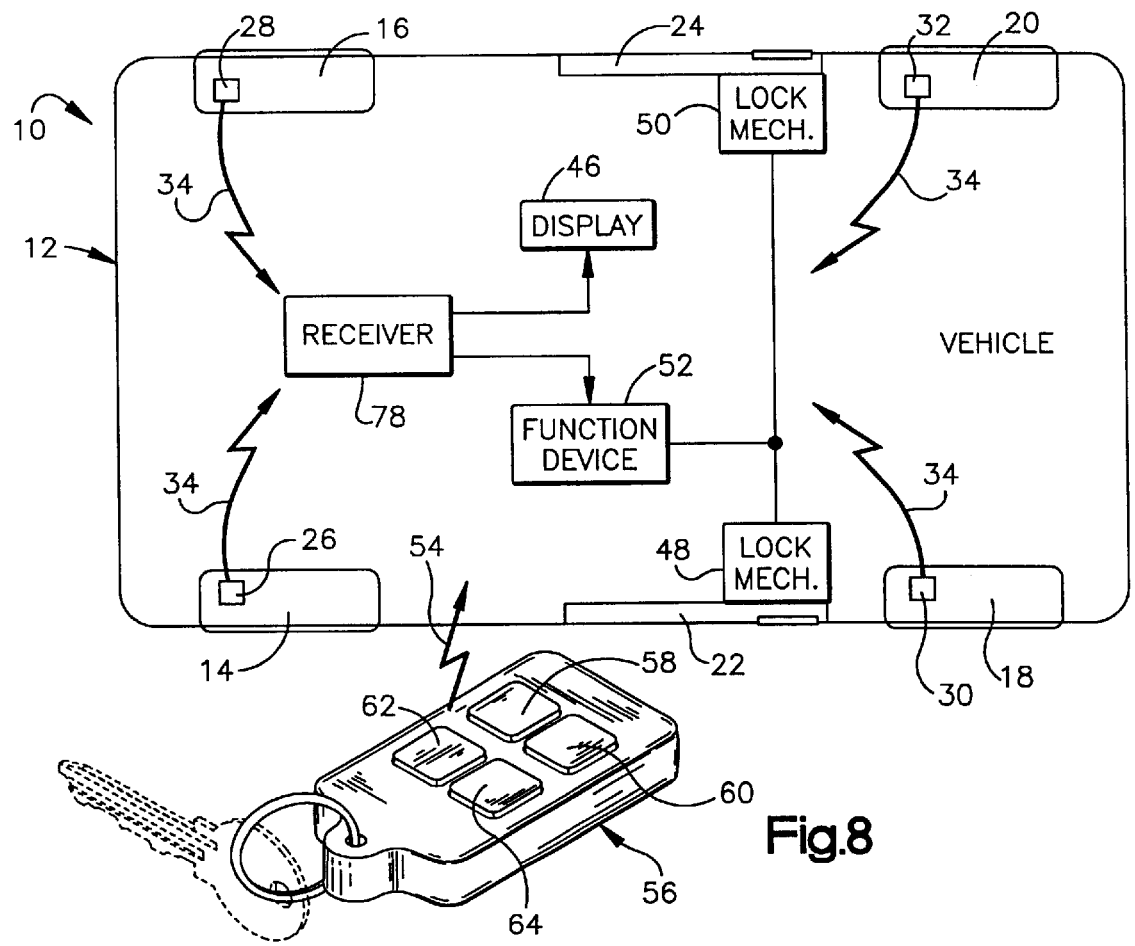
FIG. 8 is a schematic functional block diagram of an apparatus constructed in accordance with a second exemplary embodiment of the present invention.

FIG. 8 schematically illustrates an apparatus 10 constructed in accordance with a second embodiment of the present invention. In FIG. 8, the same reference number is used to identify structures that are identical or similar to the structures of FIG. 1.

The embodiment of FIG. 8 is identical to that of FIG. 1 with the exception that no condition switch 80 is present. Instead of the controller 82 of the receiver 78 receiving the vehicle condition signal from a condition switch 80, the controller 82 of the receiver 78 controls the discharging time constant of the detector 104 in response to the signal received.

For example, the controller 82 sets the detector 104 at a default time constant and then interprets data included in the preamble or wake-up portion of the received signal. In response to the data, the controller 82 controls the first and second switches 122 and 124 to provide the detector 104 with the desired time constant. As an alternative to interpreting data in the preamble, the controller 82 may monitor the data rate or data format of the received signal to determine whether the signal is a tire condition signal 34 or a convenience function signal 54. In response to the data rate or data format, the controller 82 controls the first and second switches 122 and 124 of the detector 104 for providing the desired discharging time constant. If one of the data-rate and data format is used to determine which signal is received, the tire condition signal 34 and the convenience function signal 54 must be transmitted at different data rates or using different data formats.

From the above description of the invention, those skilled in the art will perceive improvements, changes and modifications. Such improvements, changes and modifications within the skill of the art are intended to be covered by the appended claims.

Having described the invention, I claim the following:

1. An apparatus comprising:
    a controller for receiving a control parameter;
    at least one tire condition sensor for sensing a tire condition and for transmitting a tire condition signal indicative of the sensed tire condition; and
    a receiver for receiving the tire condition signal and for comparing the received tire condition signal to a changeable threshold to output a digital signal indicative of the received tire condition signal, the changeable threshold changing at time intervals determined by a time constant of the receiver, the time constant of the receiver being variable, the controller being operatively connected to the receiver and varying the time constant of the receiver in response to the received control parameter.

2. The apparatus of claim 1 wherein the receiver includes a detector, the detector having a comparator for comparing the received tire condition signal to the changeable threshold.

3. The apparatus of claim 2 wherein the detector includes an RC integrator for determining a value of the changeable threshold, the RC integrator including the variable time constant.

4. The apparatus of claim 2 wherein the detector includes a charging time constant and a discharging time constant, the variable time constant being one of the charging and discharging time constants.

5. The apparatus of claim 1 further including a transmitter device for transmitting a convenience function signal requesting performance of a convenience function, and wherein the receiver is adapted to receive the convenience function signal and to compare the received convenience function signal to the changeable threshold to output a digital signal indicative of the received convenience function signal.

6. The apparatus of claim 5 wherein the receiver includes a detector, the detector having a comparator for comparing the received convenience function signal to the changeable threshold.

7. The apparatus of claim 5 wherein the control parameter received by the controller is indicative of which one of the tire condition signal and the convenience function signal is being received by the receiver, the control parameter being determined by monitoring at least one of a data rate and data format of a signal being received.

8. The apparatus of claim 5 further including a condition switch, the condition switch being actuatable to provide the control parameter in response to sensing a condition indicative of one of operation of the vehicle and occupation of the vehicle.

9. The apparatus of claim 5 wherein the variable time constant includes first and second time constants, the receiver having a greater ability for receiving the tire condition signal when the first time constant is selected and having a greater ability for receiving the convenience function signal when the second time constant is selected.

10. The apparatus of claim 9 further including first and second switches, closure of only the first switch resulting in selection of the first time constant and closure of only the second switch resulting in selection of the second time constant.

11. The apparatus of claim 10 further including first and second capacitors, the first capacitor having a first capacitance and the second capacitor having a second capacitance, the first and second capacitances being different, closure of the first switch operatively connecting the first capacitor to the receiver and closure of the second switch operatively connecting the second capacitor to the receiver.

12. An apparatus comprising:
at least one tire condition sensor for sensing a tire condition and for transmitting a tire condition signal indicative of the sensed tire condition;
a convenience function transmitter for transmitting a convenience function signal requesting performance of a convenience function;
a display device being operable for displaying the sensed tire condition;
a function device being actuatable for performing the convenience function;
a vehicle-based receiver for receiving signals including the tire condition signal and the convenience function signal, the receiver having a variable time constant and outputting digital signals indicative of the received signals; and
a controller being operatively connected to the display device and the function device and receiving the digital signals from the receiver, the controller, in response to the digital signals, controlling the display device and the function device,
wherein the receiver includes a detector, the detector having a comparator for comparing the received signals to a threshold value, the threshold value changing at time intervals determined by the variable time constant.

13. The apparatus of claim 12 wherein the detector includes an RC integrator for determining the threshold value, the RC integrator including the variable time constant.

14. The apparatus of claim 12 wherein the detector includes a charging time constant and a discharging time constant, the variable time constant being one of the charging and discharging time constants.

15. An apparatus comprising:
at least one tire condition sensor for sensing a tire condition and for transmitting a tire condition signal indicative of the sensed tire condition;
a convenience function transmitter for transmitting a convenience function signal requesting performance of a convenience function;
a display device being operable for displaying the sensed tire condition;
a function device being actuatable for performing the convenience function;
a vehicle-based receiver for receiving signals including the tire condition signal and the convenience function signal, the receiver having a variable time constant and outputting digital signals indicative of the received signals; and
a controller being operatively connected to the display device and the function device and receiving the digital signals from the receiver, the controller, in response to the digital signals, controlling the display device and the function device,
wherein the controller determines which one of the tire condition signal and the convenience function signal is being received and varies the variable time constant in response to determining which one of the tire condition signal and the convenience function signal is being received.

16. The apparatus of claim 15 wherein the controller determines which one of the tire condition signal and the convenience function signal is being received by monitoring at least one of a data rate and data format of a signal being received.

17. The apparatus of claim 15 further including a condition switch actuatable to provide a condition signal in response to sensing a condition indicative of one of operation of the vehicle and occupation of the vehicle, the controller receiving the condition signal and, in response to the received condition signal, determining which one of the tire condition signal and the convenience function signal is being received.

18. An apparatus comprising:

at least one tire condition sensor for sensing a tire condition and for transmitting a tire condition signal indicative of the sensed tire condition;

a convenience function transmitter for transmitting a convenience function signal requesting performance of a convenience function;

a display device being operable for displaying the sensed tire condition;

a function device being actuatable for performing the convenience function;

a vehicle-based receiver for receiving signals including the tire condition signal and the convenience function signal, the receiver having a variable time constant and outputting digital signals indicative of the received signals; and a controller being operatively connected to the display device and the function device and receiving the digital signals from the receiver, the controller, in response to the digital signals, controlling the display device and the function device, further including first and second time constants, the receiver having a greater ability for receiving the tire condition signal when the first time constant is selected and having a greater ability for receiving the convenience function signal when the second time constant is selected.

19. The apparatus of claim 18 further including first and second switches, closure of only the first switch resulting in selection of the first time constant and closure of only the second switch resulting in selection of the second time constant.

20. The apparatus of claim 19 further including first and second capacitors, the first capacitor having a first capacitance and the second capacitor having a second capacitance, the first and second capacitances being different, closure of the first switch operatively connecting the first capacitor to the receiver and closure of the second switch operatively connecting the second capacitor to the receiver.

* * * * *